United States Patent [19]

Blazevic

[11] 4,209,811

[45] Jun. 24, 1980

[54] DEVICE FOR AUTOMATICALLY RECORDING, REPRODUCING AND TRANSLATING, AND CORRESPONDING CIRCUIT

[76] Inventor: Milos Blazevic, 62 rue Georges Ferrand, 94380 Bonneuil-sur-Marne, France

[21] Appl. No.: 943,853

[22] Filed: Sep. 19, 1978

Related U.S. Application Data

[63] Continuation-in-part of Ser. No. 768,563, Feb. 14, 1977, Pat. No. 4,138,696.

[51] Int. Cl.² .................... G11B 21/08; G11B 25/04
[52] U.S. Cl. ........................................ 360/78; 360/2
[58] Field of Search ................. 360/2, 78; 235/449

[56] References Cited

U.S. PATENT DOCUMENTS

| 3,685,836 | 8/1972 | Chernowitz | 360/2 |
| 3,795,794 | 3/1974 | Figuls | 360/2 |
| 3,899,659 | 8/1975 | Nakai | 360/2 |
| 3,925,814 | 12/1975 | Chernowitz | 360/2 |
| 4,031,359 | 6/1977 | Christou | 360/2 |
| 4,040,097 | 8/1977 | Mizuno | 360/2 |
| 4,138,696 | 2/1979 | Blazevic | 360/2 |

Primary Examiner—Alfred H. Eddleman
Attorney, Agent, or Firm—Brisebois & Kruger

[57] ABSTRACT

Apparatus for the recording, reproducing and automatic translation of the type utilizing rectangular magnetic cards with lines of writing on their fronts and magnetic tracks on their backs explored alternatively from left to right and from right to left by a movable magnetic head, said apparatus being characterized by the fact that each line of writing on the front corresponds to two recording tracks on the back, that each upper track of a line is traversed in the direction opposite to that of the upper track of the preceding line, that each lower line is traversed in a direction opposite to the direction of travel along the upper track of the corresponding line, the apparatus being so arranged as to permit a choice between four different patterns of travel.

5 Claims, 9 Drawing Figures

DEVICE FOR AUTOMATICALLY RECORDING, REPRODUCING AND TRANSLATING, AND CORRESPONDING CIRCUIT

This is a continuation-in-part of application Ser. No. 768,563 filed Feb. 14, 1977, now U.S. Pat. No. 4,138,696 issued Feb. 6, 1979.

This invention relates to word-processing devices utilizing magnetic cards and of the type described in U.S. Pat. No. 3,671,044.

This type of apparatus utilizes rectangular magnetic cards carrying on their front surfaces, visible at their tops, successive lines of writing which are readable from left to right and on their rear surfaces a magnetic coating adapted to permit the recording and reproduction of sound on successive parallel tracks traversed by a magnetic head which moves alternately from left to right and from right to left, reversing its direction of movement at the end of each line, when it skips to the following line, usually as a consequence of vertical displacement of the card. The sound may, for example, correspond to the pronunciation of the written line or its translation into another language. The object of the invention is to improve the variety of usages which may be made of the device without significantly increasing its technological complexity.

The invention consists in recording, for each line of writing on the front surface, two sound tracks on the rear surface, to wit, an upper sound track and a lower sound track, the lower sound track being always traversed in the direction opposite to that of the upper sound track and the apparatus being so arranged that it may function, as desired, according to any one of four patterns of travel. The first consists in reading alternately from left to right and right to left all the upper tracks. The second consists of reading alternately from right to left and from left to right all the lower tracks. The third consists in reading alternately the upper track of an odd line, the lower track of the same line, a lower track of the next even line, and then the upper track of said even line. Finally the fourth pattern consists in reading successively an upper track followed by a lower track of the same line and then moving the head in an inactive, that is to say a silent manner, to the other end to traverse again an upper track and then the lower track of the next line, and so forth.

In particular this pattern of travel may be obtained in accordance with the invention by using a double magnetic head, the two parts of which correspond to the tracks of a single line and may be switched from one to the other, while the skip from one line to the next is obtained in a mechanical manner, generally by displacement of the cards from bottom to op. The two first patterns of travel are thus obtained by substituting the mechanical skip which is normal at each end of the line without switching from one head to the other, while the third pattern of travel is attained by causing the mechanical skip to take place at each left end of the line and the switching at each right end of the line, and the fourth pattern of travel is obtained by alternately producing switching only at the ends of two of each sequence of three lines, followed by a skip without switching and with stopping of the sound, and finally the re-establishment of the sound only.

For each pattern of travel one may voluntarily cause recording or reproduction of the sound and, in accordance with the invention, each card comprises two notched zones on which two feelers bear which prevent a shift from reading to recording separately for the upper tracks and for the lower tracks, so as to effectively prevent erasure of each series of tracks when the corresponding notch is present.

The card also preferably comprises two V-shaped notches on two opposite horizontal edges which cooperate with the fingers of corresponding shape on the apparatus to assure correct positioning of the card. Finally, in accordance with the invention, the magnetic conductor is deposited on a thin sheet of polyester or similar material attached to the back of the rigid support for the card by means of a flexible layer of foam.

Other specific features of the invention will become apparent in the course of the following description of one embodiment, taken purely by way of example, and illustrated on the accompanying drawings, in which.

Figure 1:
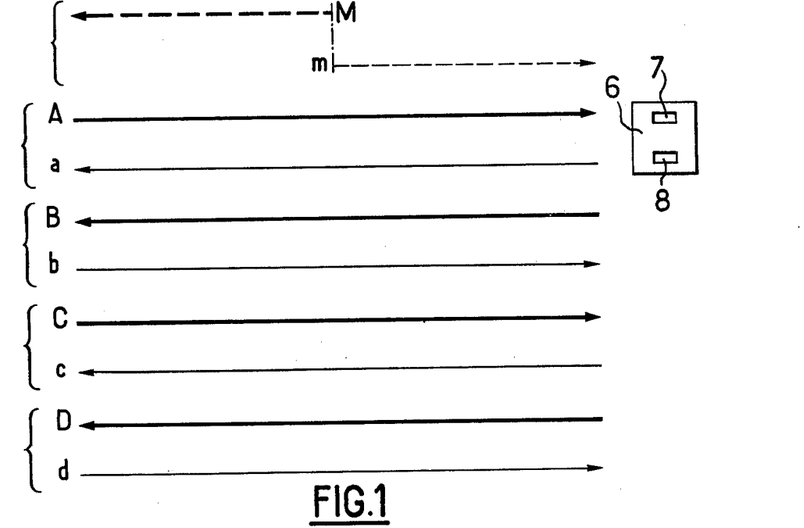
FIG. 1 is a schematic diagram of the arrangement of the tracks.
Figure 6:
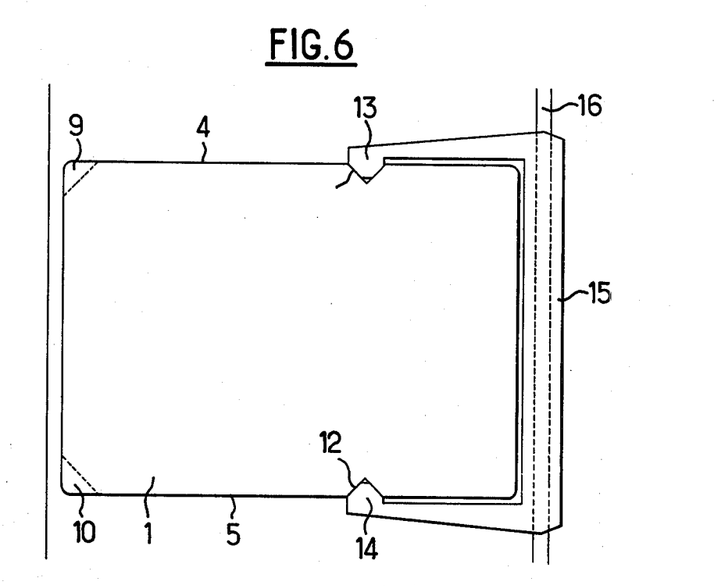
FIG. 6 is a partial view of the apparatus with its card and its centering means.
Figure 7:
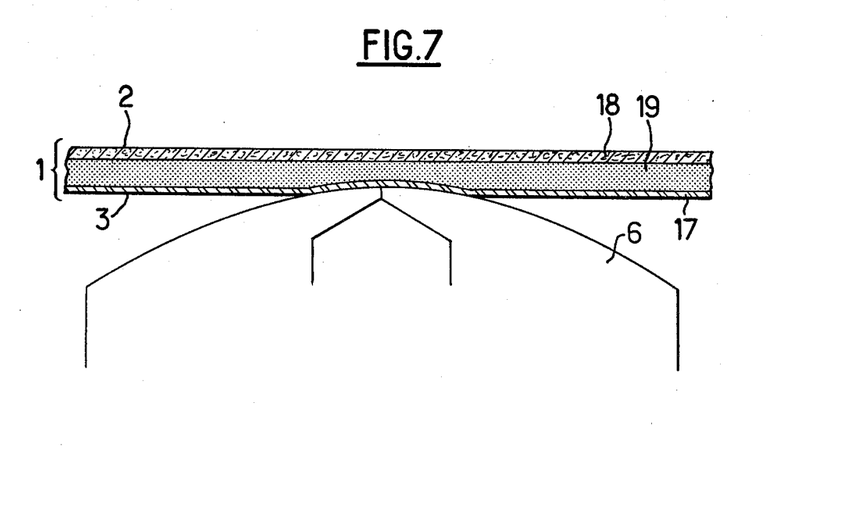
FIG. 7 shows on a larger scale a transverse section of the card and of the magnetic head in the direction of a line.

The card according to the invention indicated by reference numeral 1 on FIG. 6, preferably comprises on its front surface 2 shown on FIG. 7, 26 lines of text which makes it possible to identify these lines by the 26 letters of the alphabet from A to Z. In addition to these 26 mentioned lines one may also provide two supplementary starting and end lines as explained hereafter. At the same time the rear surface 3 of this card comprises twice as many, that is to say 52 magnetic lines represented by horizontal arrows on FIG. 1 so that two magnetic tracks on the rear surface, the uppermost of which, that is to say, the one toward the upper edge 4 of the card and the lowermost, that is to say the one toward the bottom edge 5 of the card, correspond to one line of writing on the front surface. All the upper tracks shown in heavy lines on FIG. 1 may also be designated by the 26 capital letters from A to Z while the lower tracks shown in thin lines on FIG. 1 may be designated by the corresponding lower case letters from a to z.

In accordance with the invention, each lower track such as a, b, etc. is traversed in the direction opposite to the corresponding upper track A, B, etc. At the same time, in each series, the tracks are alternately travelled from left to right and from right to left. This leads among other possibilities to the arrangement shown in FIG. 1 in which it is seen that the two successive tracks a and B are traversed in the same direction as are b and C, c and D, etc.

Figure 2:
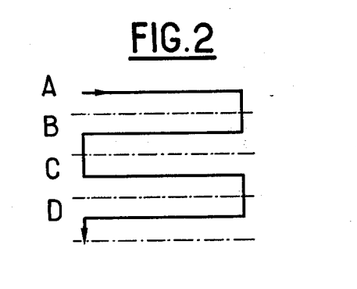
FIGS. 2, 3, 4 and 5 represent on a smaller scale patterns corresponding respectively to the four methods of travel.

This arrangement makes it possible to easily provide the four following patterns of travel:

The first method which is shown in FIG. 2 consists in successively traversing A, B, C, D, etc.

Figure 3:
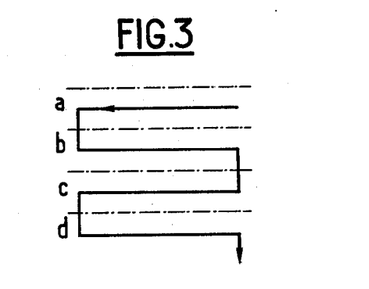

The second method is represented on FIG. 3 and consists in traversing successively a, b, c, d, etc.

Figure 4:
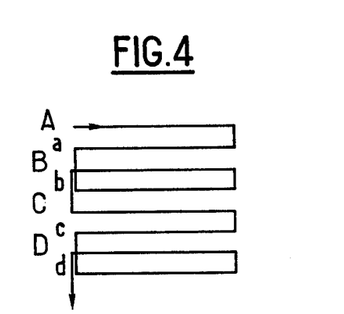

The third method which is illustrated on FIG. 4 consists in traversing successively A, a, b, B, C, c, d, D, and so forth.

Figure 5:
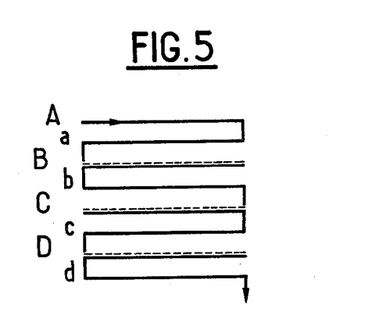

Finally, the fourth pattern of travel, illustrated on FIG. 5, consists in traversing successively A and a, then moving from left to right in an inactive manner, then traversing B and b, then moving from right to left in an inactive manner to reach C and c, and so on.

The first pattern of travel makes it possible, for example, to read or record the pronunciation corresponding to the written part of the corresponding line on the front surface while the second pattern of travel may correspond to the sound corresponding to the translation of this same text. The third method of exploration corresponds to the continuous reading of 52 tracks to utilize the maximum capacity for recording sound, without any particular distinction between the tracks.

Finally, the fourth mode of travel makes it possible to hear or record successively the text and its translation or a question and its response and this separately and successively for each of the lines of writing.

These various patterns of travel are associated with the same arrangement of the tracks on the card and may be obtained by various combinations of methods of relatively displacing the card and the magnetic head. In particular, it is recommended according to the invention to use a double magnetic head indicated by reference numeral 6 on FIGS. 1 and 7 and which comprises two parts, each having its own pole gap and winding, these parts being designated by reference numeral 7 respectively for the upper part and 8 for the lower part. Naturally these parts are as close as possible and their positions correspond for each movement of the magnetic head 6 to respective travel by said parts along an upper track and a lower track. This makes it possible to use the mechanism enabling one to skip from line to line either by displacement from top to bottom of the head or more generally by displacement from bottom to top of the card, each mechanical skip thus corresponding exactly to the pitch of a line of writing along the front of the card. Naturally, none of the reversing mechanism for reversing the direction of movement of the head at each end of the line has changed.

In this case the first method of travel, corresponding to FIG. 2, is obtained by simply letting the skipping mechanism operate at the end of each line, both at the right and the left, while leaving the upper part of the magnetic head constantly switched on from one end to the other of the card. In this way, the method of exploration of FIG. 3 is obtained by mechanically skipping at each end of the line and holding the lower part 8 of the head constantly switched on.

The third pattern of travel represented on FIG. 4 is obtained in a very simple manner thanks to the arrangement indicated, by requiring a mechanical skip at all the left ends of the lines and requiring switching from one of the parts 7 and 8 of the head to the other at each right end of a line.

Finally, the fourth pattern of travel represented on FIG. 5 is obtained by starting with the upper part 7 switched on and switching from one head part to the other at the right end of the track only, then mechanically skipping and switching head parts at the left end of the line at the same time that the sound is stopped, and then turning on the sound without skipping and without switching head parts at the right end of the line, after which the same cycle is reproduced with movement in the opposite direction, and so forth.

It should always be noted that the second pattern of travel (FIG. 3) begins at the right, while the first pattern (FIG. 2) as well as the third and fourth (FIGS. 3 and 4) begin at the left. For this reason two supplementary lines are provided, one of which is a zero or starting line and one a 27 or end line. These two lines are not used when recording sound, but are adapted to comprise, if desired, material such as the title or the references. On the other hand, before starting any pattern the magnetic head is systematically stopped in the center of the starting line at the point marked M—M on FIG. 1, and all patterns thus begin with a single inactive half-line. In effect, there is at the zero line, whether written or not, corresponding to the rear surface an imaginary upper track in the region M and an imaginary lower track in the region m, the directions of travel being those of even lines (zero being considered as even). The first pattern of travel is initiated by switching on the head on the upper part 7 located at M using the corresponding direction of travel. The half-line M is traversed to the left and silently since nothing has been recorded. Then the skip to the first line permits travel from the left. The second pattern of exploration is produced by the part 8 using the corresponding direction so that the half-line m is traversed toward the right to begin the travel from the right. For purposes of simplification these inactive displacements shown in broken lines on FIG. 1 have not been shown on FIGS. 2 to 5.

In like manner, when the head arrives at the end of the last or 26 line, it travels in the corresponding direction silently halfway along the line 27 (the bottom line) to stop in the middle of this line (not shown on these figures) ready for a new pattern of travel of any one of the four types.

In the patent referred to above a position indicator is provided which moves along the written line and always from left to right. In the present invention this mechanically displaced indicator is replaced by an electric cursor (FIG. 8) which moves along a series of successive contacts which light a series of stationary electric bulbs constituting a luminous indicator. In addition the contact in the middle of the series serves at the same time to bring about the stopping of the head at the center of the line.

Finally, it will be seen that all these patterns of travel may be obtained in an extremely simple manner from a single control console, preferably electronic, provided that the skipping mechanism is electrically actuated.

As a supplemental improvement, two sets of notches are provided in any position on the edges of the card, or two truncated zones are provided at the two corners of the cards as shown at 9 and 10 on FIG. 6, and the apparatus comprises two feelers actuated by these notches or truncations and making it possible to prevent passage from reading to recording separately for the upper tracks and the lower tracks.

For example, the truncation 9 may prevent the rerecording with erasure of the upper track while the truncation 10 produces the same result for the lower tracks. Naturally, if the two truncations 9 and 10 or the two notches are formed simultaneously any possible erasure of the card is prevented and it then becomes a single reading.

This improvement may be naturally used with all the patterns of travel described, but is particularly valuable with the fourth pattern of travel since this latter exploits separately and successively the two tracks of each line. In this case, in effect, one obtains automatically and without any supplementary device, all the switchings necessary without having to intervene manually. For example, if one has formed a notch or truncation blocking the upper tracks and not the lower tracks and if, on the other hand, one actuates the button or combination of buttons for the fourth method of exploration as well as the button for recording, the latter is suppressed and automatically replaced by reading only in the first travel along line A, and then at the end of the line the apparatus passes automatically to recording and travels over line a, then the red signal which habitually signals recording goes out for the return in silence from left to right, and one begins to read the track B, and then passes automatically to recording while following track b and so on. By way of example, the apparatus may read a phrase of a foreign language, and record the pupil pronouncing this same phrase before passing to the next. It may also pose a question and automatically record the answer or any other desired combination. One thus sees that the new arrangement is extremely rich in possible methods of utilization. With respect to the manual control of the four patterns of travel, it is possible to use four separate buttons, but it is also possible to use only two buttons, one corresponding, when it is depressed, to the travel along A–Z and the other to a–z. The depression of the two buttons causes reading of the 26 lines according to the third pattern of travel and finally the release of the two buttons may by convention correspond to the fourth pattern of travel.

To assure good centering of the magnetic card while leaving the edges of this card necessary for the preceding notches free, it is suggested according to the invention to provide two supplemental notches 11 and 12 shown on FIG. 6 having a V-shaped profile on the two edges 4 and 5 of the card. These notches then cooperate with two centering fingers 13 and 14 having a corresponding profile fixed to a member 15 in the form of a clip having slightly elastic arms which thus takes all of the play and insures rigorous centering, both in position and in orientation, of the magnetic card 1. At the same time the member 15 slides on a rail 16 and thus serves as a carriage to insure the displacement of the card. The previously described feelers (not shown on the figure) may also be carried by this movable member 15.

This arrangement makes it possible, as in the above-mentioned patent, to slide the card over a fixed platen (not shown) provided with only a horizontal exploration window for the magnetic head. Moreover the card may advantageously be covered by a transparent wall. Habitually the magnetic head 6 is mounted on a spring so as to be pressed elastically against the back 3 of the magnetic card which is thus lifted and subjected to pressure beneath this transparent wall. However, by reason of the substantial inertial mass which the recording head has, the effort of pressing the latter against the card is necessarily itself relatively substantial, which leads to a substantial wear on the magnetic coating, and on the other hand, despite this force, the head remains sensitive to shocks undergone by the apparatus.

In order to avoid this defect, the invention provides for mounting the magnetic head with little or no elasticity and to make the magnetic card itself elastic in the direction of its thickness. For this purpose, the magnetic coating is positioned on the lower face 3 of a thin sheet of polyester 17 shown on FIG. 7, said sheet being itself connected to the rigid support 18 of the card, which may be made of cardboard, by a compressible layer 19 made of a thin plastic foam or other product compressible in thickness.

As a result of this arrangement the pressure of the magnetic layer 3 on the head is regulated to a very low value by the compression of the relatively flexible layer 19 and the inertia of the part of the sheet thus displaced is practically negligible. It follows that the apparatus is absolutely insensitive to shocks which is very important for a portable apparatus and, on the other hand, the foam imperatively dampens all sorts of mechanical longitudinal or transverse vibrations which may propagate in the magnetic layer in response to movement of the head 6.

Figure 8:
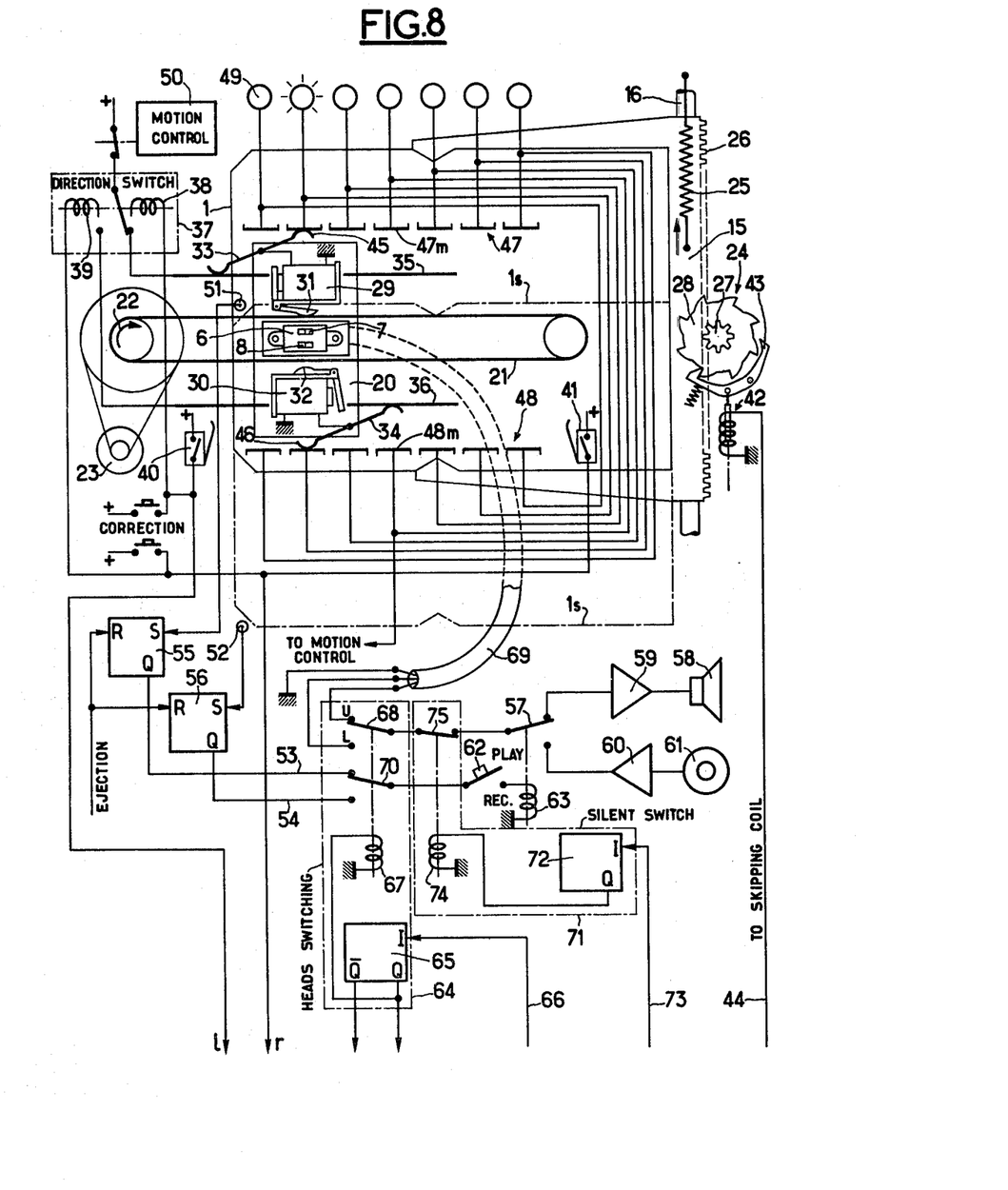
FIGS. 8 and 9 show schematically, the apparatus of U.S. Pat. No. 3,671,044, modified to provide the scanning patterns of FIGS. 2–5, with FIG. 9 forming a continuation of the bottom of FIG. 8.
Figure 9:
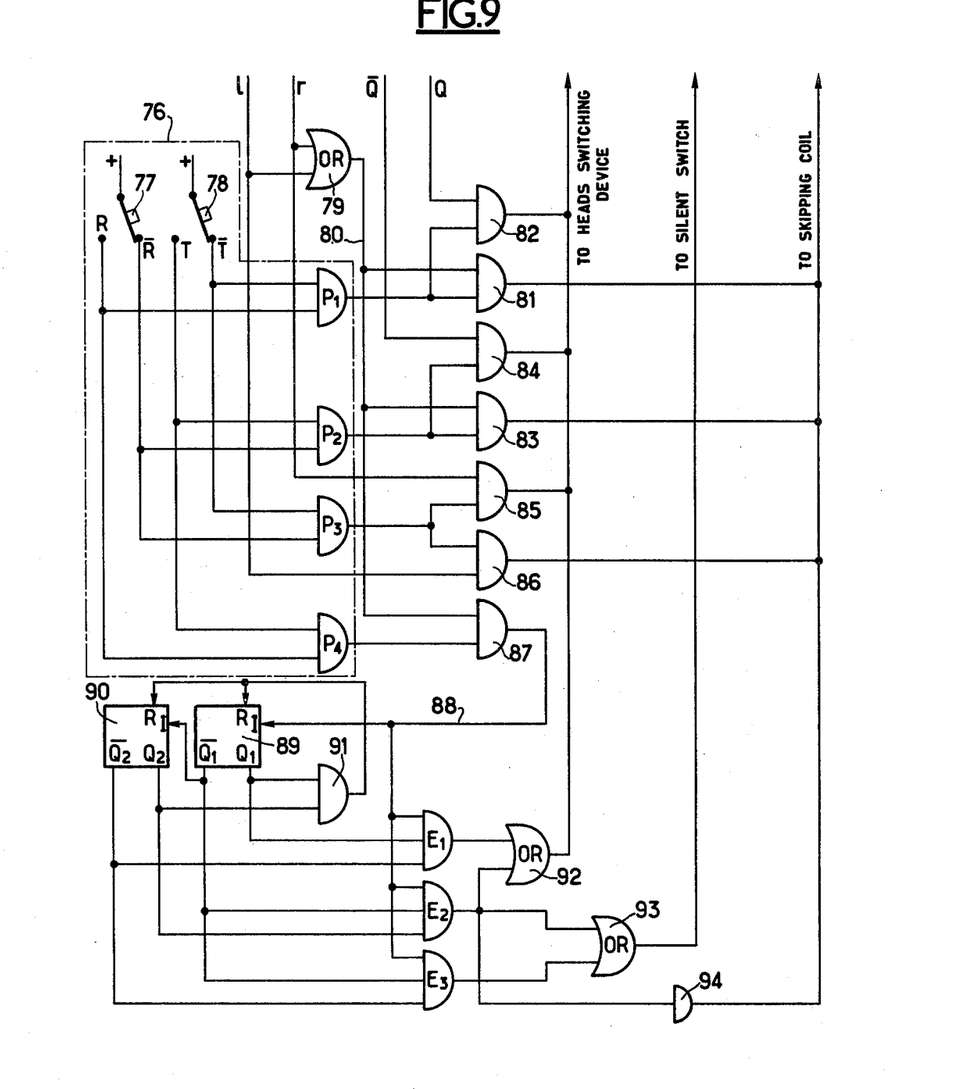

Now refer to FIGS. 8 and 9, which show a preferred apparatus for performing the scanning patterns shown at FIGS. 2–5, this apparatus being a variation of the apparatus of U.S. Pat. No. 3,671,044. As shown at FIG. 8, magnetic head 6 is mounted on a horizontally guided carriage 20 which is moved horizontally back and forth on a base (not shown) by alternately clutching the carriage to one side or the other of an endless belt 21 continuously driven in the direction of arrow 22 by a motor 23. The card 1 is mounted in the carrier 15 which moves the card perpendicularly to the direction of travel of carriage 20, to provide skipping, by the action of mechanism 24. The skipping mechanism 24 is of the general type shown in U.S. Pat. No. 3,671,044 and includes a spring 25 biasing carrier 15 upwardly and a rack 26 on the carrier meshing with a pinion 27 fixed to a release wheel 28.

As previously mentioned, the clutch mechanism of head carriage 20 is preferrably electrically controlled. This clutch mechanism includes electromagnets 29 and 30 which actuate respectively, clutching or gripping arms 30 and 31 for alternately clutching carrier 20 to belt 21. The electrical connections to permit energizing electromagnets 29 and 30 can take the form of flexible wires, but preferably, comprises brushes 33 and 34 which slide respectively along continuous conductive tracks 35 and 36 mounted on the base which supports carriage 20. Conductors 35 and 36 are connected respectively to the terminals of a bi-stable direction switch 37. This switch has energizing coils 38 and 39 controlling respectively, movement of carriage 20 to the right when coil 38 is energized, and to the left when coil 39 is energized. The coil 38 is energized by a left end position sensor 40 and the coil 39 is energized by a right end position sensor 41, the sensors being actuated by carriage 20 at the corresponding ends of its stroke, and taking the form of limit switches.

As indicated in U.S. Pat. No. 3,671,044, where clutching is electrically acutated, the skipping can also be electrically actuated. Correspondingly, end sensors 40 and 41 are also used to control the skipping mechanism 24 via the logic circuit of FIG. 9. Actuation of electromagnet 42 which operates skip mechanism 24 is via line 44 in a manner soon to be explained.

Carriage 20 operates a cursor or indicator by means of supplementary brushes 45 and 46 which move with the carriage along fixed segmented conductive tracks 47 and 48, respectively. Each segment is connected to an electric bulb of a series of bulbs 49 for illuminating the bulbs successively always from left to right, regardless of the travel direction of the head carriage 20. As is evident from FIG. 8, when direction switch 37 is in the position shown, current is supplied to brush 45 through conductor 35 and brush 33, and clutch arm 31 is engaged with belt 21 to move carriage 20 to the right.

During such travel, conductor 36 is unenergized so brush 46 receives no current from brush 34. When carriage 20 reaches the righthand end of its travel, limit switch 41 energizes coil 39 to switch the direction switch 37 thereby energizing conductor 36 to actuate clutch arm 32 and also to provide current to brush 46. Via the wiring shown, the bulbs 49 are thus again illuminated from left to right during travel of carriage 20 from right to left. Preferably, the center segments 47m and 48m are connected together and to motion control 50 to permit stopping carriage 20 at the center of the line by operating motion control 50.

The card 1 shown at FIG. 8, for purposes of illustration, has both of its corners truncated (the corners 9 and 10 of FIG. 6 are removed). Feelers 51 and 52 (FIG. 8) are provided to sense the presence or absence of these truncated corners. These feelers can be mounted on a backing plate or base on which the card slides. The feelers 51 and 52 are arranged to detect the presence or absence of a truncated corner of the card only when the card is in the phantom line position 1s (the start position of the card). The output of the respective feelers is to the respective flipflops 55 and 56 each of which is of the reset type. The output of the flipflops appears on the respective lines 53 and 54. The flipflops are each arranged so that an input signal at either terminal S switches the flipflop to a high or one ligic state where it remains until reset by a signal from a card ejection sensor (not shown).

As is conventional in card recording-playing apparatus, there is a record-play switch 57 connected to head 6 for selectively connecting the head 6 either to a speaker 58 through an amplifier 59 for playback, or to the output of amplifier 60 connected to a microphone 61 for recording. A manual switch 62 actuates switch 57, via relay coil 63 which moves switch 57 to the record position when the coil is actuated. A head switching control 64 includes a single input flipflop 65 with a direct output $\overline{Q}$ and a complimentary Q. The output Q is connected to coil 67, which when unenergized connects contact 68 to terminal U to energize the upper head 7 and which when energized connects switch 68 to terminal L to actuate the lower head 8. Also, coil 67, when energized, actuates contact 70 to connect manual switch 62 to line 53, and when energized actuates contact 70 to connect switch 62 to line 54.

If neither corner of the card is truncated, feelers 51 and 52 are both actuated and flipflops 55 and 56 are both set. Correspondingly, there is a signal on both outputs 53 and 54 so that coil 63 can be energized by manipulating manual switch 62 to select recordings. However, if either corner of the card is truncated, the coil 63 cannot be energized in at least one direction of traverse of the carriage 20 and when both corners are truncated, no recording can occur during either direction of traverse of carriage 20. Hence, where both corners are truncated, the card is a "play only" card and cannot be recorded. This arrangement permits recording on both the upper and lower tracks if the card is not truncated at all, permits recording on both tracks if both corners are truncated, or permits recording on either the upper track or the lower track depending on which corner is truncated.

For performing the function of inactive return or a sound-off condition, there is a silent switch 71 which includes a flipflop 72 of the single input type, having its input fed by a silent switch line 73. The output of flipflop 72 is connected to a coil 74 which when energized opens switch 75 in series with speaker 58 to disconnect the speaker and provide for a silent or inactive traverse. Correspondingly, when silent switch 71 receives a pulse from line 73, there can be neither playback nor recording until another pulse is received from line 73.

The switch to permit selecting any one of the four different patterns described above could be a four position rotary switch or a four-key keyboard. However, it is preferred that the pattern select arrangement take the form of a two key manual selector 76. Selector 76 has keys or switches 77 and 78 each of a single pull double throw type which permits selecting four different states as a result of the possible binary combination. The key 77 is termed a reader key and can be switched from a normal or rest position $\overline{R}$ to an active position R. Key 78 is termed a translator key and can be manually switched from a rest position $\overline{T}$ to an active position T. Pattern selector 76 includes four AND gates $P_1$, $P_2$, $P_3$, and $P_4$. These gates correspond respectively to the previously described patterns 1, 2, 3, and 4, shown respectively at FIGS. 2, 3, 4 and 5 of the drawings. Activating the required one of AND gates $P_1$–$P_4$ by manipulating keys 77 and 78 selects the desired pattern.

To produce the scanning pattern of FIG. 2, reader key 78 is depressed to contact terminal R. A signal appears at both inputs of AND gate $P_1$ because of the connection of key 78 to terminal $\overline{T}$ and key 77 to terminal R. If pattern 2 is desired, translator key 78 is depressed to contact terminal T, and signals appear at both inputs of AND gate $P_2$. Where neither key is depressed, inputs are received on AND gate $P_3$ to select the third pattern of FIG. 4. Switching key 77 to terminal R and key 78 to terminal T selects the fourth pattern of FIG. 5 and supplies signals to both inputs of AND gate $P_4$.

The circuitry of FIG. 9 is a continuation of the lower part of FIG. 8. This circuitry includes a plurality of two input AND gates 81–87 which are connected to various outputs of AND gates $P_1$–$P_4$, and which also receive signals from lines 1 and r. The lines 1 and r are connected respectively to left end track sensor 40 and right end track sensor 41. In addition, there are lines $\overline{Q}$ and Q on which signals appear depending on the state of flipflop 65 of the head switching device 64. Both inputs of an OR gate 79 are connected to lines 1 and r so that a signal appears on line 80 each time either track end sensor 40 or track end sensor 41 is actuated.

When the first pattern (FIG. 2) is selected by depressing key 77 so it engages terminal R, AND gate $P_1$ sends a signal to the input of AND gate 81 so that any track end impulse from line 80 will open gate 81 and send a signal to skipping coil line 44 to cause skipping or indexing at the end of each line. The output of gate $P_2$ is also connected to one input of an AND gate 82 which has its other input connected to output Q of flipflop 65. Since the pattern number 1 of FIG. 2 requires that the upper recording head always be energized, a signal on line Q from flipflop 65 indicates that the switch 68 is in the lower head position, and correspondingly, AND gate 82 senses this improper condition and sends a signal along line 66 to switch flipflop 65 so its output at terminal Q is zero. In this state, switch 68 connects upper terminal U and only the upper head is energized. Correspondingly, with AND gate $P_1$ open or on, the upper head 7 is always energized, and the signal from AND gate 81 causes skipping or indexing at the end of each line.

When the second pattern (FIG. 3) is selected (key 77 engaging terminal $\overline{R}$ and key 78 engaging terminal T)

AND gate P₂ is on and applies a signal to one input of AND gate 83 and one input of AND gate 84. In the pattern of FIG. 3, only the bottom head operates, and there is skipping or indexing at the end of each line. When a line end signal appears on line 80, AND gate 83 is turned on and pulses skipping coil line 44 so that there is skipping or indexing at the end of each line. AND gate 84 if it receives a signal on line $\overline{Q}$ (which indicates that the head switch is in the upper head position) turns and sends a signal to flipflop 65 to switch the flipflop so the output from line $\overline{Q}$ is zero, thereby energizing coil 67 to switch the switch 68 to the 1 terminal in which lower head 8 is selected. Correspondingly, when AND gate P₂ is on, lower head 8 is always on, and there is skipping or indexing at each end of a line.

Pattern 3 is selected by leaving key 77 and 78 in their at rest position so that AND gate P₃ is turned on. The output of AND gate P₃ feeds one input of each of AND gates 85 and 86. AND gate 86 sends signals to skipping coil line 44, but only when the left end sensor 40 is activated so that a signal appears on line 1. AND gate 85 sends a head switching signal along line 66 but only when right end sensor 41 is activated so that a signal appears on line r. This produces the third pattern (FIG. 4) in which there is head switching only at the right end of each line, and there is skipping or indexing only at the left end of each line. This occurs because AND gate 86 is turned on only at the left end of each line and AND gate 85 is turned on only at the right end of each line.

To select the fourth pattern of FIG. 5, keys 77 and 78 are each depressed to turn on AND gate P₄. The output of P4 is connected to an input of AND gate 87 to enable this AND gate to be turned on by a line end signal on either line 1 or line r, i.e. when either left end sensor 40 or right end sensor 41 is activated. Because pattern number 4 requires three different sequences, which are traverse left to right with upper head on, switch to lower head and traverse to left without indexing, index, then traverse with both heads from left to right, switch upper head on and traverse from right to left, switch lower head on and traverse from left to right, index with silent return from right to left and then a repeat of this cycle. Correspondingly, it is necessary to have a sequence of three different signals to control head switching to obtain the pattern of FIG. 5. Flipflops 89 and 90 and AND gate 91 combine to form a count-by-three counter. Three input AND gates E₁, E₂, and E₃ receive the signals from flipflops 89 and 90 to permit obtaining the required pattern through the outputs of OR gate 92, OR gate 93, and one way gate 94, which can be a diode.

Each flipflop 89 and 90 has an input terminal I and reset terminal R. Flipflop 89 has complimentary outputs $Q_1$ and $\overline{Q_1}$ and flipflop 90 has complimentary outputs $Q_2$ and $\overline{Q_2}$. AND gate 91 is connected to $Q_1$ and $Q_2$ and its output is connected to reset terminals R of both flipflops 89 and 90. This AND gate 91 functions to reset the count cycle at a three count so that the flipflops do not proceed to an additional count of four.

In the quiescent or reset state, the outputs of flipflops 89 and 90 are:

$$Q_1 = Q_2 = 0, \text{ and } \overline{Q_1} = \overline{Q_2} = 0 \quad (A)$$

A first line end signal turns AND gate 87 on to provide a first input to input I of flipflop 89 which changes the outputs of these flipflops to the following:

$$Q_1 = 0, Q_2 = 1, \overline{Q_1} = 0, \overline{Q_2} = 0 \quad (B)$$

When the carriage again reaches an end, AND gate 87 is again turned on to send a second impulse to the input of flipflop 89 so that the outputs of the flipflops:

$$Q_1 = 0, Q_2 = 1, \overline{Q_1} = 1, \overline{Q_2} = 0 \quad (C)$$

When a third end line signal appears on line 80, AND gate 87 is again enabled and sends a pulse along line 88 to the input of flipflop 89. The output of the flipflops in response to this signal are:

$$Q_1 = 1, Q_2 = 1, \overline{Q_1} = 0, \overline{Q_2} = 0 \quad (D)$$

In this condition of the flipflops with the output of $Q_1$ and $Q_2$ at 1, reset flipflop 91 is turned on and returns the flipflops to the reset state, thereby eliminating a fourth count. It will be noted that $Q_1$ and $Q_2$ are so connected that their outputs cannot enable any of AND gates E₁, E₂, and E₃.

Assume for purposes of explanation that pattern 4 has been selected, and AND gate P4 is on. Also assume that flipflops 89 and 90 are in their reset state, that upper transducer head 7 is on, and that the carriage is travelling from left to right as shown by the first line A of FIG. 5. When the carriage reaches the righthand end of the line, right hand end sensor 41 is activated, flipflop 89 is pulsed, and a first end pulse is sent on line 88 to produce the signal pattern B and gate E₁ which switches from upper head to lower head through OR gate 92. The carriage then traverses toward the left and upon reaching the left end another signal appears on line 88 which produces output B of the flipflops and enables AND gate E₂. This causes simultaneous switching from lower head 8 to upper head 7 via OR gate 92, activates silent switch 71 through OR gate 93, and operates the skip or index by sending a signal to skip line 44 through one-way gate 94. There is then silent traverse, and when the carriage reaches the right end and another end signal appears on line 88, the flipflops have their outputs in condition D which results in resetting the flipflops to condition A, and turning off the silent switch via the output from OR gate 93. As will be recognized, this is in essence the start position of the pattern of FIG. 5, safe that the carriage is now traversing from right to left. Correspondingly, it is evident that for each sequence of three traverses, there is only switching at the first end, there is switching, indexing, and activation of the silent switch at the second end, and the silent switch is turned off to reestablish sound at the third end.

In the event that head switch 64 is in the wrong condition when pattern four is selected, the operator can obtain the desired condition i.e. select the upper head or the lower head simply by manipulating the correction switches in parallel with the respective line end sensors 40 and 41.

In view of the foregoing, it is evident that applicant has provided a unique scanning system and apparatus for selectively accomplishing this system, and that numerous changes can be made without departing from the scope of this invention as set forth herein and defined in the appended claims.

What is claimed is:

1. In an automatic device for recording, reproducing and translating, said device being of the type using magnetic rectangular cards having visible horizontal lines of writing on their front surfaces which are readable from left to right, and a magnetic coating on their rear surfaces to support magnetic tracks traversed alternately from left to right and from right to left by a movable magnetic head, a skipping mechanism for producing relative displacement between said cards and device to permit passage from one line to the next, and in which each line of writing on the front surface corresponds to two tracks on the rear surface of each card, namely an upper track and a lower track, each upper track of a line is traversed by said head in a direction opposite to that of the upper track of the preceding line and each lower track is traversed in a direction opposite to the direction of travel over the upper track of the corresponding line, said device being arranged to permit the choice between four different patterns of travel the first corresponding to the alternate travel along the upper tracks, the second corresponding to the alternate travel along the lower tracks, the third corresponding to the alternate travel along the upper track of a first line, followed by the lower track of the same line, the lower track of the next line, and finally the upper track of the next line, and the fourth method of exploration corresponding to the exploration of an upper track of a first line, then the lower track of the same line, then an inactive return to the other end of the track to subsequently traverse the upper track of the following line and the lower track of the same following line, and so on, the improvement comprising a double magnetic head having an upper head and a lower head which correspond respectively to said upper tracks and said lower tracks, the skipping mechanism having a pitch corresponding to that between lines of writing, and being electrically controlled, and an automatic control circuit comprising means for carrying out the first pattern of travel by switching on the upper magnetic head and and controlling the mechanical skipping at each end of the path of travel by sensors at the end of said path of travel, means for carrying out the second pattern of travel in the same manner but with the lower head, means for carrying out the third pattern of travel utilizing the mechanical skip at each left end of each track and switching between heads at each right end of each track, and means for carrying out the fourth pattern of travel by successively, for each sequence of three track ends, only switching heads at the first end of the track, mechanically skipping and switching with stopping of its sound at the second track end, and re-establishing sound without switching or skipping at the third track end.

2. Device according to claim 1 in which said lines are preceded by a supplemental starting line and followed by a stopping supplemental line, each associated with corresponding upper and lower tracks and the magnetic head stops systematically in the center of these supplemental lines at the end and at the beginning of each pattern of travel in response to an automatic stopping device.

3. Device as claimed in claim 2 in which the movements of the magnetic head mechanically drive a cursor moving always in the same direction along a series of electrical contacts lighting a series of electrical bulbs constituting a luminous indicator showing the length of a line and in which the contact in the middle of said series constitutes the detecting device of said automatic stopping device.

4. Device according to claim 1 comprising a feeler detecting the possible presence of discontinuity on the card to electrically prevent the switching of the device toward a recording position in spite of manual actuation of a recording button, said device comprising two feelers cooperating with two discontinuities and acting separately and respectively for the upper tracks and for the lower tracks to obtain the replacement of recording by reading in order to insure in the third and fourth patterns of travel the automatic alternation of the reproducing recording phases.

5. Magnetic card as claimed in claim 1 which comprises at least two discontinuities adapted to cooperate with locking feelers of two series of tracks.

* * * * *

UNITED STATES PATENT AND TRADEMARK OFFICE
CERTIFICATE OF CORRECTION

PATENT NO. : 4,209,811
DATED : June 24, 1980
INVENTOR(S) : Milos Blazevic

It is certified that error appears in the above—identified patent and that said Letters Patent is hereby corrected as shown below:

[30] Foreign Application Priority Data

March 25, 1976    France....................76 08629

Signed and Sealed this

Twelfth Day of August 1980

[SEAL]

Attest:

SIDNEY A. DIAMOND

Attesting Officer      Commissioner of Patents and Trademarks